(12) United States Patent
Shako et al.

(10) Patent No.: US 8,677,815 B2
(45) Date of Patent: Mar. 25, 2014

(54) APPARATUS FOR A BOREHOLE INFLUX FLUID PARAMETERS MEASUREMENT

(75) Inventors: Valery Vasilyevich Shako, Domodedovo (RU); Vyacheslav Pavlovich Pimenov, Moscow (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 590 days.

(21) Appl. No.: 12/981,099

(22) Filed: Dec. 29, 2010

(65) Prior Publication Data

US 2011/0154896 A1    Jun. 30, 2011

(30) Foreign Application Priority Data

Dec. 31, 2009    (RU) .................................. 2009149590

(51) Int. Cl.
*E21B 47/10*    (2012.01)
(52) U.S. Cl.
USPC ....................................................... 73/152.29
(58) Field of Classification Search
USPC ....................................................... 73/152.29
See application file for complete search history.

(56) References Cited

U.S. PATENT DOCUMENTS

| | | | |
|---|---|---|---|
| 4,733,232 A * | 3/1988 | Grosso | 367/82 |
| 5,154,078 A * | 10/1992 | Codazzi | 73/152.22 |
| 5,275,040 A * | 1/1994 | Codazzi | 73/152.22 |
| 5,551,287 A | 9/1996 | Maute et al. | |
| 6,223,821 B1 * | 5/2001 | Coronado | 166/250.01 |

FOREIGN PATENT DOCUMENTS

WO    9623957 A1    8/1996

OTHER PUBLICATIONS

Chekalyuk, E. B., "Ermodinamika neftyanogo plasta (Thermodynamics of Oil-Bearing Layer)", Oil Stratum Thermodynamics, Nedra Publishing, Moscow, 1965, pp. 67.
Cheremenski, G. A., "Applied Geothermics", Nedra Publishing, Leningrad, 1977, pp. 181-182.

* cited by examiner

*Primary Examiner* — Hezron E Williams
*Assistant Examiner* — Rodney T Frank

(57) ABSTRACT

The apparatus for a borehole influx fluid parameters measurement comprises an enclosure open on two adjacent sides and having a poorly deformable heat-insulating rear wall, a cover and side walls made of elastically deformable heat-insulating material. Inside the enclosure a cellular structure of elastically deformable heat-insulating material is mounted with the gap relative to the enclosure's rear wall and having the through cells insulated from one another. Said cells forming the apparatus inlet openings on one side of the cellular structure and on the other side they are connected with the gap, the total area of the inlet openings significantly exceeds the area of the structure side surface they are located at. The transducers for the measurement of the influx fluid parameters are disposed inside the cells.

8 Claims, 2 Drawing Sheets

APPARATUS FOR A BOREHOLE INFLUX FLUID PARAMETERS MEASUREMENT

FIELD OF THE INVENTION

Figure 1:
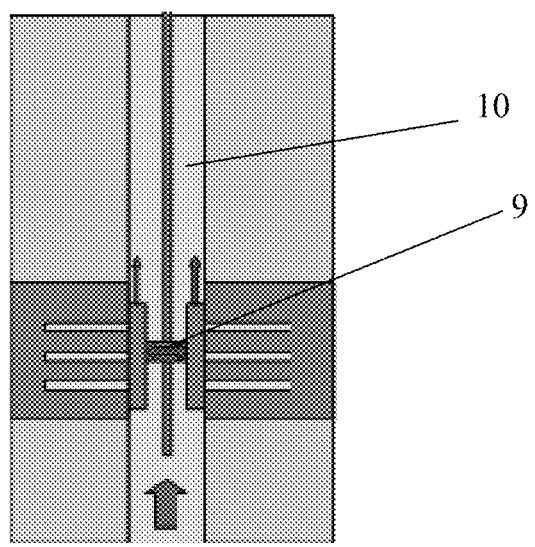

The invention is related to geophysical research of oil and gas boreholes and may be used, particularly, for the determination of productive formations parameters and near-borehole area parameters (perforation zone parameters, bottomhole area pollution parameters) etc. particularly, the following parameters may be measured: influx temperature, local yield, influx chemical and phase composition.

Thus, the temperature measurement in oil/gas wells enables, particularly:

evaluation of the production zones location in the productive boreholes and fluid saturation zones in the injection wells;

evaluation of different productive zones yield based on the energy conservation law for mixing streams;

segregation of behind-the-casing cross-flow zones etc.

BACKGROUND OF THE INVENTION

To evaluate the yield of different productive areas (determine the influx profile) based on the energy conservation law for mixing streams, a high accuracy of the borehole fluid temperature measurement is required and the temperature of the influx (fluid flowing into the borehole from the productive formation) needs to be known. Until now, the influx temperature has been calculated as the sum of the formation rocks temperature and thermodynamic value of Joule-Thomson effect. In general, the accuracy of the influx temperature evaluation is in the order of 1 K which is not sufficient to quantify the influx profile, therefore, thermometry is only used to ensure a reliable influx profile evaluation. More accurate results are supposed to be obtained from complex temperature data, namely, the data which, alongside with the influx temperature obtained through standard temperature logging, also includes temperature measurement of the fluid flowing into the borehole from productive strata.

On the other hand, from the prior art it is known (Chekalyuk E. V. Thermodynamics of Oil-Bearing Layer, Nedra, 1965, p. 238) that the temperature of the fluid flowing into the borehole, even from the initially isothermic formation changes over the time (in engineering literature this effect is referred to as non-stationary Joule-Thomson effect). The information of the influx temperature change rate as function of time may be used to determine the parameters of the polluted reduced-permeability near-borehole area (Yu. A. Popov, V. P. Pimenov, V. V. Tertychnyi, Developments of Geothermal Investigations of Oil and Gas Fields, Oilfield review, spring 2001, pp. 4-11).

Therefore, the claimed apparatus for the borehole influx fluid parameters measurement, particularly influx temperature, enables high-accuracy determination of both temperature and other parameters of the fluid flowing into the borehole from the productive formation.

In terms of engineering essence, the closest apparatus for the borehole influx fluid parameters measurement is the apparatus for the measurement of temperature, phase composition and flow rate of the fluid flowing into the borehole or injected into the formation as disclosed in U.S. Pat. No. 5,551,287. The main element of the apparatus as disclosed in the patent above is a fragment of a thin-wall cylinder with the curvature radius equal to the inner radius of the cased borehole. The cavity in the central part of this apparatus includes numerous thin plates positioned perpendicularly to the cased borehole surface. During the implementation of the method of the influx fluid temperature measurement using this apparatus the apparatus is located in the influx zone on the borehole inner wall and pressed thereto. Therefore, the fluid from the perforation channels can freely flow between the said plates into the borehole central part. The apparatus provides fluid stream isolation from the borehole fluid stream. The fluid temperature is measured with the transducers positioned in these plates.

The disadvantage of this engineering solution is low accuracy of the measured fluid temperature values because the facilities used in the apparatus do not duly prevent mass- and heat-transfer between the formation and borehole fluid which influences the accuracy of the obtained measurement data of the fluid parameters and the data obtained do not reflect their true values.

SUMMARY OF THE INVENTION

The purpose of this invention is the elimination of these disadvantages, namely—improved accuracy of the parameters of the influx fluid flowing into the borehole.

The result is attained due to the fact that an enclosure of an apparatus for a borehole influx fluid parameters measurement is made open on two sides and includes a rear wall, a cover and side walls. The rear wall is made of low-deformable heat-insulating material. In general the enclosure provides thermal and hydrodynamic isolation of the influx fluid from the borehole fluid.

The enclosure may additionally include a bottom with at least one fluid outlet opening.

Inside the enclosure, with the gap relative to its rear wall, a cellular structure made of elastic deformable heat-insulating material is disposed; in the through cells of this structure isolated from one another, transducers for the fluid influx parameters measurement are mounted. On one the said cells make inlet openings and on the other side they are connected with the gap between the cellular structure and the enclosure rear wall.

The total area of the inlet openings significantly exceeds the total area of the cellular structure elements pressed to the casing string surface which provides unimpeded influx of the fluid from the perforation channel (located in the cellular structure areas) to any of the measurement cells, i.e. the total area of the apparatus inlet openings significantly exceeds the surface area of the structure they are located at.

The cellular structure may be made as a lattice formed by partitions crossing in perpendicular directions. The measurement cells may also be of n-angular polygon where n is the number of its angles. All the cells have equal dimensions.

To improve the influx fluid isolation from a borehole fluid which filled the cells before the apparatus was pressed to the borehole wall, the cells may be connected with the gap by the openings with the size significantly smaller than the cells' inlet openings.

Temperature transducers are located in the cells whereas the transducers measuring flow rate, chemical and phase composition of the influx fluid may be located in the gap between the cellular structure and the enclosure rear wall immediately next to the enclosure open side or bottom.

DETAILED DESCRIPTION OF THE PREFERRED EMBODIMENTS

Figure 2:
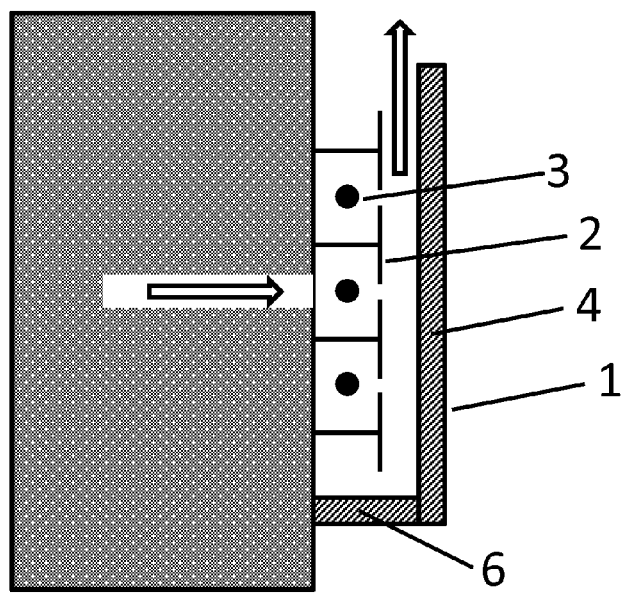
Figure 3:
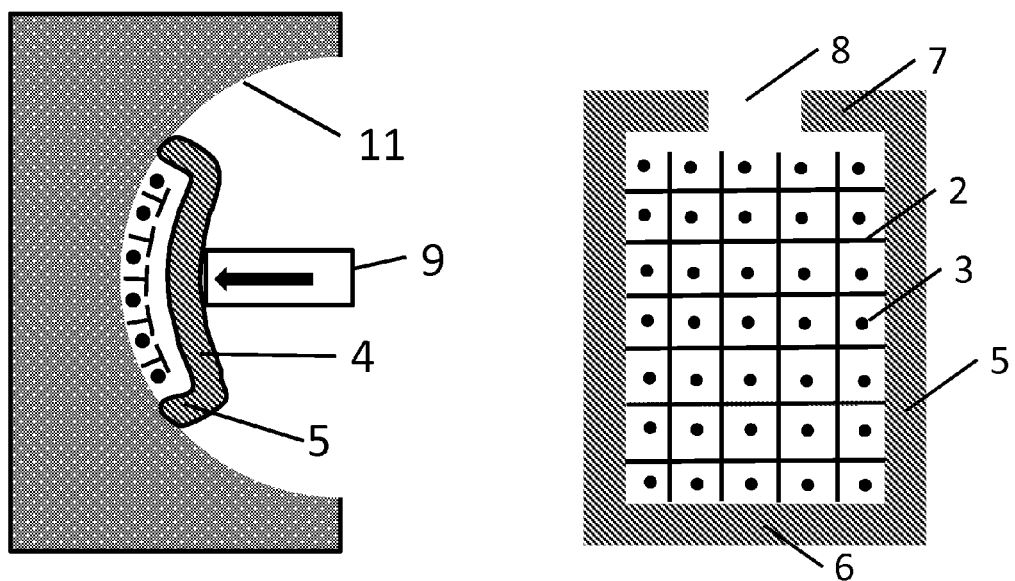

The claimed inventions are explained by the following drawings:

FIG. 1—A version of the two apparatuses for the fluid parameters' measurement in the borehole;

FIG. 2—Apparatus for the borehole influx fluid parameters measurement (vertical cross-section); and FIG. 3—Apparatus for the borehole influx fluid parameters measurement (horizontal cross-section and view from the casing string).

An apparatus for a borehole influx fluid parameters measurement comprises an enclosure 1 having a rear wall 4, a cover 6 and side walls 5 made solid and hermetically connected with one another. The rear wall 4 is made of poorly deformable heat-insulating material; the cover 6 and side walls 5 are made of elastic deformable heat-insulating material, for example, elastic plastic or rubber. The enclosure 1 may be additionally equipped with a bottom 7 having minimum one opening 8.

Inside the enclosure 1 a three-dimensional mesh structure of measurement cells 2 made of elastic deformable heat-insulating material, for example, elastic plastic or rubber, is located, it may also include a metal frame. Each measurement cell includes a transducer 3 and is an independent measurement element.

The apparatus has pressing element 9.

The apparatus operates as follows.

The apparatus is sunk into a borehole and located at the productive formation level in a fluid influx zone (the influx fluid comes into the borehole through perforation openings made in the casing string wall). The apparatus is tightly pressed to a wall 11 of the casing string 10 using the pressing element 9. A pneumatic spring or another device with a pneumatic, hydraulic or electric drive capable of tight pressing of the device to the internal surface of the casing string 10 may be used as the pressing element. Curvature radius of the device when pressed to the wall 11 of the casing string 10 is equal to the inner curvature radius of the casing string 10. It is possible to use several of these devices simultaneously. If more than one device is used, they are positioned in the borehole symmetrically to the axis thereof (FIG. 1).

At the start all the measurement cells are filled with the borehole fluid and the parameters measured with transducers 3, for example, cell fluid temperature (if the apparatus is used to measure the influx fluid temperature), will have the values approximately equal to the borehole fluid temperature.

Then the productive formation fluid will enter the measurement cells opposite the perforation channels thus displacing the borehole fluid out of them. The temperature in these measurement cells will change and this change will be fast enough due to the small volume of the fluid in each side. This change will be recorded by the temperature transducers 3 located in each measurement cell. In the remaining cells, due to the fact that they are made of heat-insulating material, the temperature will not change for a period of time.

Therefore, it is possible to identify and determine the cells that will measure the temperature (or another parameter) of the fluid influx.

"Spent" fluid in the relevant cells passes through the gap between the cellular structure and the rear wall of the enclosure and leaves the apparatus from its upper part flowing into the main borehole fluid upstream. It is in this position of the fluid outlet that the borehole fluid will not enter the gap between the cellular structure and the rear wall of the enclosure because the influx fluid's pressure exceeds that of the borehole fluid.

The heat-insulating walls of the enclosure enable influx fluid heat insulation from the main stream in the borehole, i.e. elimination of the heat transfer processes influence on the influx fluid parameters measurement accuracy.

The heat-insulating measurement cells enable heat-insulation of each measurement cell by elimination heat transfer through the cells' walls (during the method implementation the adjacent cells may be filled with different fluids—influx fluid and borehole fluid—having different temperatures) which enables high-accuracy measurement of the influx fluid temperature.

On the other hand, fabrication of the enclosure walls (particularly, side walls and the cover) and measurement cells of elastic deformable material provide the influx fluid hydraulic isolation from the overall borehole stream which is implemented as follows.

The cellular structure is a set of measurement cells with an equal height (in situations where it may be a rectangular shape, the structure may be made as a lattice formed by the partitions crossing in perpendicular directions, spatially it is a parallel piped). This structure is mounted inside the enclosure so that through this structure the influx fluid enters the apparatus (the structure on one side is the apparatus front wall (side) and the measurement cells—inlet openings of the apparatus). Simultaneously, the structure wall opposite to the one mentioned above and the enclosure (the apparatus rear wall) make a gap for unimpeded outlet of the fluid from the measurement cells. Therefore, effort application to the apparatus enclosure (as pressing effort) together with the flexibility (elastic deformation) of the enclosure material and structure cells provides the influx fluid hydraulic isolation from the main borehole fluid stream.

The shape of the measurement cells and, consequently, the cellular structure may be different. The measurement cells may be n-angled polygons where n is the number of its angles (square, pentagon, hexagon etc.). In any case, their dimensions must be commensurate with the perforation openings and the cellular structure dimensions—based on the number of $n_p$ perforation openings per 1 meter of the borehole length.

On average $s_p$ area of the casing string surface falls per one perforation opening of the casing string:

$$s_p = \frac{2\pi \cdot r_c}{n_p},$$

where $r_c$ is the casing string radius.

To prevent less than $N_m$ perforation channels occurrence in the measurement zone, the measurement cells mesh area must exceed $N_m \cdot s_p$. If we assume that the measurement cells mesh covers the share of $\delta$ of the borehole circumference (the mesh structure width is $b_t = \delta \cdot 2\pi \cdot r_c$), its height $h_t$ must be $$h_t = \frac{N_m}{\delta \cdot n_p}$$

For $r_c$=0.1 M, $N_m$=3, $\delta$=0.3 and $n_p$=15 M⁻ we find the mesh structure size: $b_t * h_t$=0.2 M*0.6 M.

Time constant $\Delta t$ of the apparatus is determined by the time over which the borehole fluid is displaced by the formation fluid from one perforation channel from the measurement cell with the volume of $V_{cell}$:

$$\Delta t \approx \frac{V_{cell}}{q_p}$$

where $$q_p = \frac{2\pi \cdot k_e}{\eta \cdot n_p} \cdot \frac{\Delta P}{S + \ln(r_e/r_c)}$$

Is the average yield of one perforation channel, $\Delta P$—difference between formation pressure and borehole pressure, $\pi$—mathematical constant equal to 3.14159, $\eta$—fluid viscosity, $k_e$—formation permeability $r_c$ and $r_e$—casing string radius and formation outer boundary radius. For a 3 cm×3 cm×1 cm cell we have $V_{cell} \approx 10^{-5}$ m³. with $k_e = 10^{-13}$, $\Delta P = 20$ $B$ ap, $\eta = 10^{-2}$ Pa·s, $S+\ln(r_e/r_c) \approx 9$ we have $q_p \approx 10^{-6}$ m³/s, i.e. the apparatus time constant in this case is equal to 10 sec.

What is claimed is:

1. An apparatus for a borehole influx fluid parameters measurement comprising:
   an enclosure open on two adjacent sides and having a poorly deformable heat-insulating rear wall, a cover and side walls made of elastically deformable heat-insulating material, the enclosure made to allow a flow of the influx fluid via the enclosure and providing the influx fluid insulation from a borehole fluid,
   a cellular structure made from elastically deformable heat-insulating material and mounted inside the enclosure with a gap relative to the rear wall of the enclosure and having through cells insulated from one another, the through cells form the apparatus inlet openings on one side of the cellular structure and on the other side the through cells are connected with the gap, a total area of the inlet openings significantly exceeds the area of the structure side surface the inlet openings are located at,
   transducers for the measurement of the influx fluid parameters disposed inside the through cells, and a pressing element.

2. The apparatus of claim 1 wherein the rear wall, the cover and the side walls are hermetically joined.

3. The apparatus of claim 1 wherein the enclosure is equipped with a bottom having at least one fluid outlet opening.

4. The apparatus of claim 1 wherein the cellular structure is made as a lattice formed by partitions crossing in perpendicular directions.

5. The apparatus of claim 1 wherein the through cells have the shape of n-angled polygon, where n is the number of angles of the polygon.

6. The apparatus of claim 1 wherein the through cells have equal dimensions.

7. The apparatus claim 1 wherein the through cells are connected with the gap by means of openings with dimensions a lot smaller than those of the inlet openings.

8. The apparatus of claim 1 wherein temperature transducers are located in the through cells and transducers measuring flow rate, chemical and phase composition of the influx fluid are located immediately close to the enclosure open side.

* * * * *